UNITED STATES PATENT OFFICE.

JEREMIAH D. GREEN, OF TROY, NEW YORK.

COMPOSITION FOR SEWER, DRAIN, AND WATER PIPES, &c.

SPECIFICATION forming part of Letters Patent No. 255,251, dated March 21, 1882.

Application filed January 10, 1882. (Specimens.)

*To all whom it may concern:*

Be it known that I, JEREMIAH D. GREEN, a citizen of the United States, residing at the city of Troy, in the county of Rensselaer and State of New York, have invented a new and useful compound, which I call "Unrivaled Concrete," which is fully set forth in this specification.

This invention relates to a class of compounds to be used in the manufacture of sewer, drain, and water pipes, conduits, tubes, &c.; also, street-pavements, paving-blocks, and insulators for telegraph-wires, or non-conductors of electricity, or any other thing to which it may be applied.

This compound is formed by the following ingredients, viz: Take about five hundred pounds of coal-tar or coal-tar pitch, put it into a suitable boiler, and boil it until the residue will bear the following test, viz: Take some of said residue out from said boiler, cool it until cold, then put it into water, the heat of which should be about 120°. Let it remain about twenty minutes. If it does not perceptibly soften, then that in the boiler is right for mixing. Then put into said boiler with the coal-tar about seventy-five pounds of asphaltum. Then take about from twenty-five to thirty-five pounds of unboiled coal-tar, put it into a suitable iron vessel, and raise the heat in said vessel to about 180°. When the coal-tar is quite hot and thin put into it two quarts of linseed or cotton-seed oil, then about four pounds of sulphur; mix thoroughly; then put in about sixteen pounds of oxide of iron or its equivalent; mix; then put this mixture into the large boiler with the heated coal-tar and asphaltum, raise the heat in said boiler to about 300°, and continue such heat for about one hour. Stir this mixture constantly until the foam ceases to rise; then draw off this mixture into forms or barrels to cool. When wanted for making into pavements, pipe, or other articles, have a large iron pan or receptacle in which said compound can be heated and mixed. Then break up the aforesaid compound, or so much thereof as may be desired—say proportionably about one hundred pounds; put this into said heating-pan and raise the heat until said mixture is quite thin and hot. Then mix in about one pint of salt, then about three hundred pounds of clean dry sand or gravel, which should be hot when put in. Mix thoroughly. Then mix in about twenty-five or thirty pounds of hydraulic cement.

This mixture should be thoroughly pressed, rolled, or driven into the forms or molds while hot and within a few minutes after adding the cement, so as not to destroy the bond of the cement.

For some purposes calcined plaster may be used in place or stead of the hydraulic cement, such as electrical insulators, bases of portable lamps, stand-tops, &c. In such cases fine beach-sand may be used in lieu of coarse sand or gravel; but for pipes, paving-blocks, and street-pavement cement is preferable to calcined plaster.

A slight change in the quantity of the ingredients herein described may be made without changing the invention. The oil or salt may be omitted when the character of the other materials used is such as to admit of such change; but I believe the ingredients named herein and the mode of mixing or manipulating to be the best for the purposes named.

This compound makes pipe, conduits, pavements, or floors that are impervious to water or moisture and are not affected by frost or heat or gas, which are very destructive to sewers and drains.

This compound is a perfect non-conductor of electricity, and can be formed into various kinds and shapes for insulators or other articles. It is not affected by the elements either below or above the ground.

I am aware that concretes have been made for various purposes having some of the ingredients contained therein which I employ in my combination; but those combinations and the manipulation thereof are essentially and entirely different from mine.

Having described my improvements, what I claim as new, and desire to secure by Letters Patent, is—

A concrete composed of coal-tar, asphaltum, oxide of iron, sulphur, sand or gravel, hydraulic cement, or calcined plaster, and either with or without oils or salt, prepared substantially as described and set forth.

JEREMIAH D. GREEN.

Witnesses:
M. McEWEN,
GEO. F. GRAHAM.

Corrections in Letters Patent No. 255,281.

It is hereby certified that in Letters Patent No. 255,281, granted March 21, 1882, to Jeremiah D. Green of Troy, New York, for an improvement in "Compositions for Sewer, Drain, and Water Pipes, &c.," the word "four" was inadvertently printed instead of the word "eight" in line 33 of the printed specification attached to and forming a part of said Letters Patent; that the proper corrections have been made in the files and records pertaining to the case in the Patent Office, and are hereby made in said Letters Patent.

Signed, countersigned and sealed this 4th day of April, A. D. 1882.

[SEAL.]
                   A. BELL.
*Acting Secretary of the Interior.*

Countersigned:
 E. M. MARBLE,
  *Commissioner of Patents.*